United States Patent [19]

Brockelsby et al.

[11] Patent Number: 5,196,846
[45] Date of Patent: Mar. 23, 1993

[54] MOVING VEHICLE IDENTIFICATION SYSTEM

[76] Inventors: William K. Brockelsby, 11025 82 Avenue #1006, Edmonton, Canada, T6G 0T1; Conrad M. B. Walker, Rural Route #5, Site 11, Edmonton, Canada, T5P 4B7; Michael L. Hryciuk, 11719-28 Avenue, Edmonton, Canada, T6J 3P1; Donald P. Gillis, 11448 71st Avenue, Edmonton, Canada, T6G 0A7

[21] Appl. No.: 539,703

[22] Filed: Jun. 18, 1990

Related U.S. Application Data

[63] Continuation-in-part of Ser. No. 446,234, Dec. 5, 1989, which is a continuation-in-part of Ser. No. 383,169, Jul. 20, 1989, Pat. No. 4,937,581, which is a continuation of Ser. No. 195,400, May 13, 1988, Pat. No. 4,870,419, which is a continuation of Ser. No. 661,712, Oct. 17, 1984, abandoned, which is a continuation-in-part of Ser. No. 536,010, Sep. 26, 1983, abandoned, which is a continuation-in-part of Ser. No. 234,570, Feb. 13, 1981, abandoned.

[51] Int. Cl.$^5$ ............................................. G08G 1/01
[52] U.S. Cl. ...................................... 340/933; 340/905; 340/825.34; 340/825.54; 342/42; 342/44
[58] Field of Search ............... 340/988, 905, 933, 928, 340/825.54, 825.34; 342/42, 51, 44; 455/89; 246/122 R; 235/381, 384; 371/34

[56] References Cited

U.S. PATENT DOCUMENTS

| | | |
|---|---|---|
| 3,163,860 | 12/1964 | Bailey . |
| 3,346,864 | 10/1967 | Harmon . |
| 3,594,798 | 7/1971 | Leydorf et al. . |
| 3,691,488 | 9/1972 | Holtum, Jr. . |
| 3,713,148 | 1/1973 | Cardullo et al. . |
| 3,750,163 | 7/1973 | Hecker . |
| 3,772,668 | 11/1973 | Smith . |
| 3,803,616 | 4/1974 | Kopf et al. . |
| 3,839,717 | 10/1974 | Paul . |
| 3,914,762 | 10/1975 | Klensch ............... 342/44 |
| 3,918,057 | 11/1975 | Van Tol . |
| 4,015,259 | 3/1977 | Siverhus et al. . |
| 4,068,211 | 1/1978 | Van Tol ............... 340/933 |
| 4,104,630 | 8/1978 | Chasek . |
| 4,114,151 | 9/1978 | Denne et al. . |
| 4,167,007 | 9/1979 | McGeoch et al. . |
| 4,209,783 | 6/1979 | Ohyama et al. . |
| 4,303,904 | 12/1981 | Chasek ............... 340/428 X |
| 4,687,445 | 8/1987 | Williams . |
| 4,728,933 | 3/1988 | Christen et al. ............... 340/666 X |

OTHER PUBLICATIONS

Report entitled, "Heavy Vehicle Electronic License Plate Program—AVI Test Program—Interim Report and Recommendations" by Castle Rock Consultants.
Report entitled, "Heavy Vehicle Electronic License Plate (HELP) Program—Automatic Vehicle Identification (AVI) Research and Development" Project Final Report, dated Mar., 1990 by Castle Rock Consultants.

Primary Examiner—Jin F. Ng
Assistant Examiner—Jeffrey A. Hofsass
Attorney, Agent, or Firm—Fitch, Even, Tabin & Flannery

[57] ABSTRACT

A system for exchanging information by means of transmitted RF signals between a fixed location interrogator and a vehicle transponder moving in the vicinity of the interrogator. The transponder responds to a first trigger signal from the interrogator by transmitting to the interrogator a first data message derived from data stored in a transponder memory. The interrogator then remotely reprograms the transponder memory and generates a second trigger pulse. The transponder responds to the second trigger pulse by transmitting the reprogrammed data it then stores and the interrogator analyzes the last mentioned transmission to determine if the transponder properly received and responded to the reprogramming.

14 Claims, 10 Drawing Sheets

DATA RECEIVER DETAIL

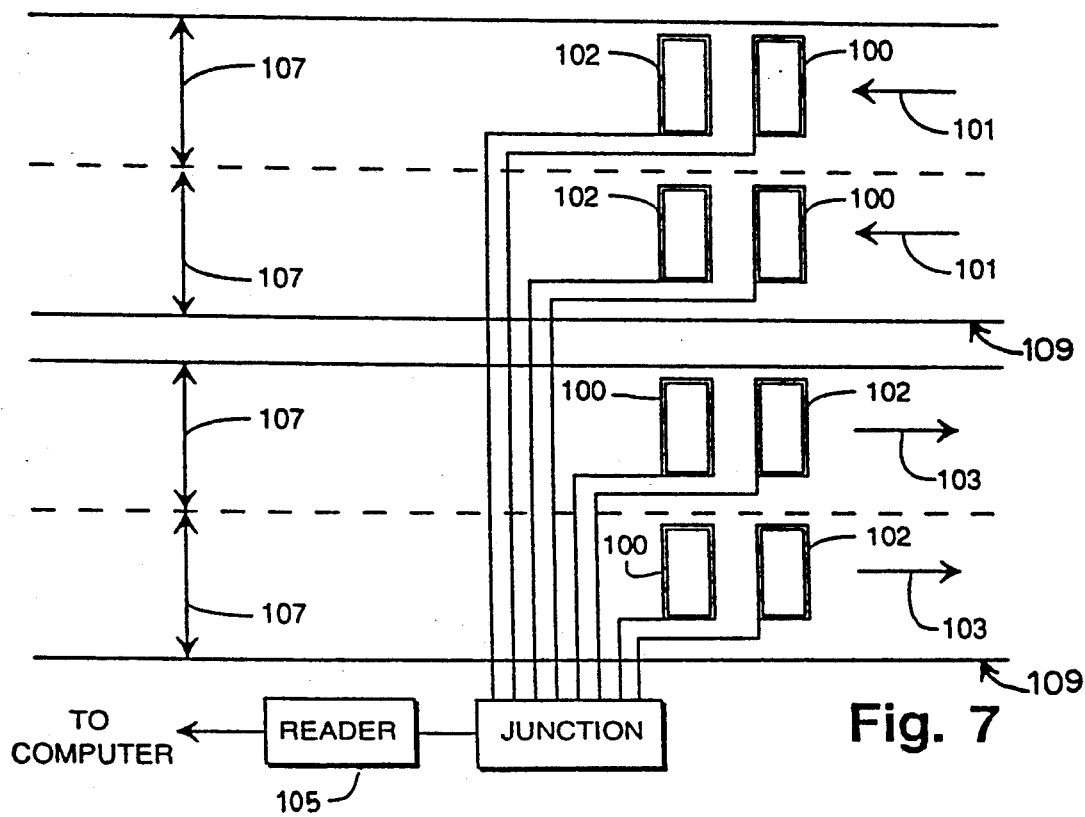
Fig. 7
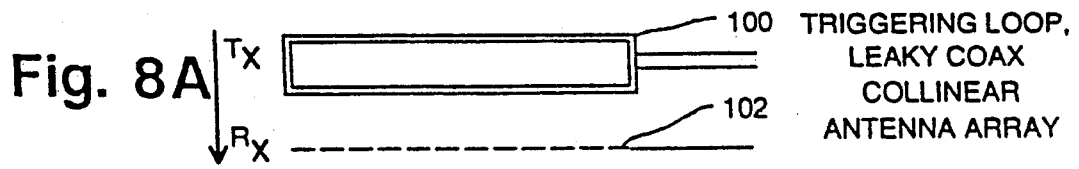
Fig. 8A — TRIGGERING LOOP, LEAKY COAX COLLINEAR ANTENNA ARRAY
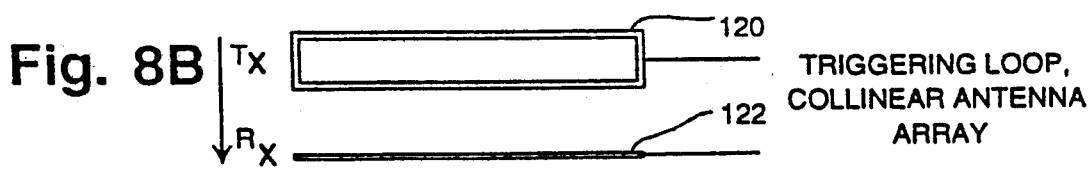
Fig. 8B — TRIGGERING LOOP, COLLINEAR ANTENNA ARRAY
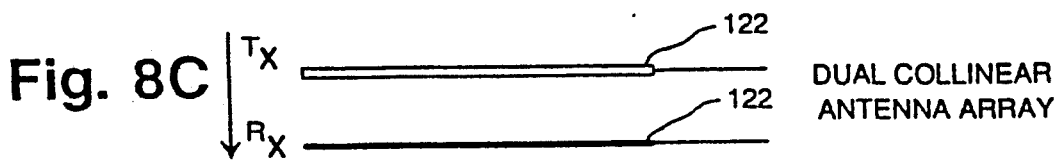
Fig. 8C — DUAL COLLINEAR ANTENNA ARRAY
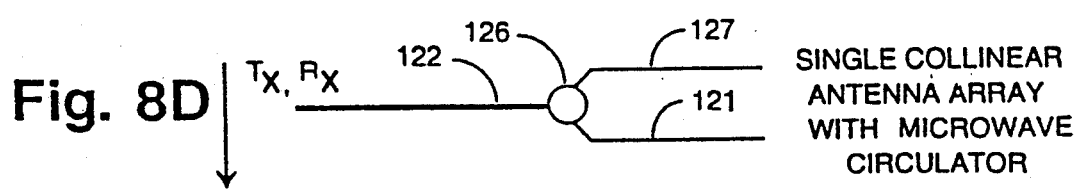
Fig. 8D — SINGLE COLLINEAR ANTENNA ARRAY WITH MICROWAVE CIRCULATOR

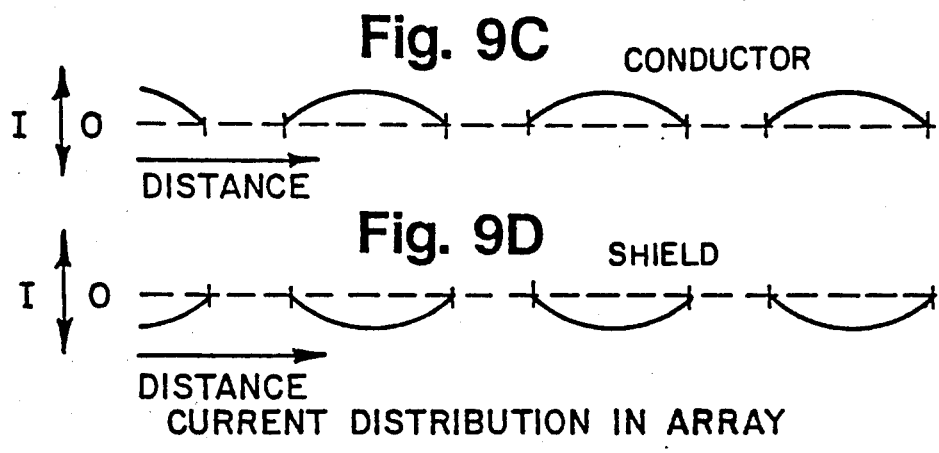
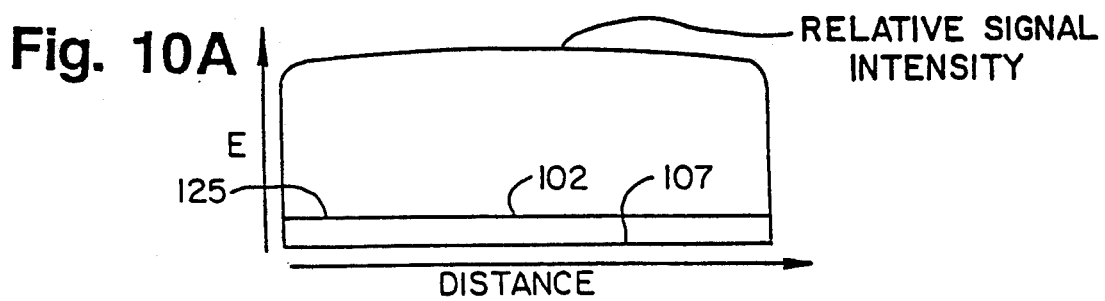
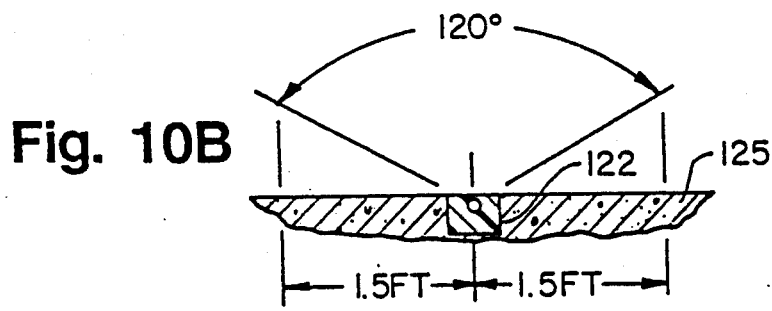
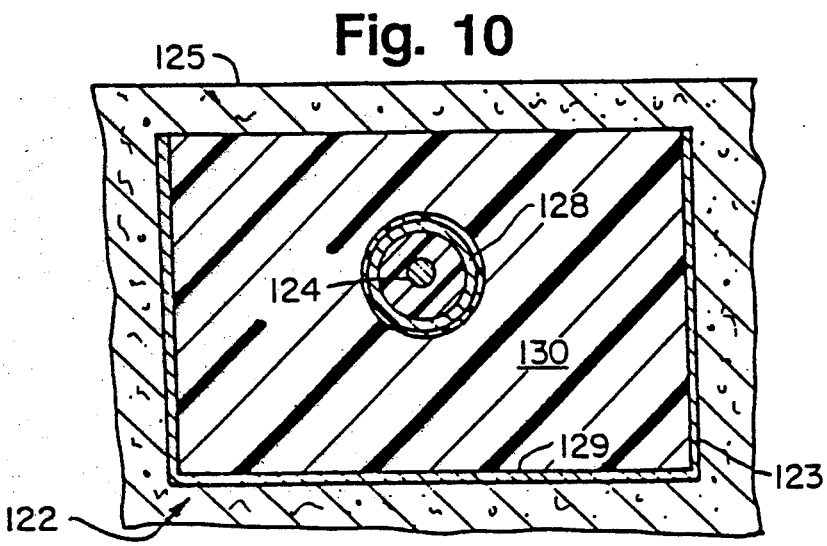

MOVING VEHICLE IDENTIFICATION SYSTEM

This is a continuation-in-part of co-pending application Ser. No. 446,234 filed Dec. 5, 1989 to Brockelsby, et al., (by request for change of inventor) for Highway Vehicle Identification System With High Gain Antenna and assigned to the present assignee and still pending; which is a continuation-in-part of co-pending application Ser. No. 383,169, filed Jul. 20, 1989, to Baldwin, et al., for Electronic Identification System, and assigned to the present assignee and now U.S. Pat. No. 4,937,581; which is a continuation of Ser. No. 195,400, filed May 13, 1988, to Baldwin, et al., for Electronic Identification System, and assigned to the present assignee and now U.S. Pat. No. 4,870,419, issued Sept. 26, 1989; which is a continuation of application Ser. No. 661,712, filed Oct. 17, 1984, to Baldwin, et al., for Electronic Identification System, assigned to the present assignee and now abandoned; which is a continuation-in-part of application Ser. No. 536,010, filed Sept. 26, 1983, to Baldwin, et al., for Electronic Identification System, assigned to the present assignee and now abandoned; which is a continuation-in-part of application Ser. No. 234,570, filed Feb. 13, 1981, to Baldwin, et al., for Electronic Identification System, assigned to the present assignee and now abandoned.

BACKGROUND OF THE INVENTION

This invention relates to automatic vehicle identification systems and particularly to such systems which include the ability to accurately modify data stored in a vehicle transponder while the vehicle is in motion.

There is a need for an identification system wherein moving objects such as railroad cars and motor vehicles, passing an interrogation station, identify themselves for both accounting and control purposes. Such a system would also be applicable to boats, trucks, shipping containers, mail bags, pallets, etc. In addition to the above uses the ability to read, write, delete or modify data in a digital form makes the system applicable to a variety of uses, an example of which is a credit card. In this case, the system serves as a portable interrogable memory for information such as a credit balance.

The complexity of modern transportation systems has increased to the point where automated traffic management has become essential for efficient operation. This is true of railways, highway truck transportation, and urban transit systems. Early attempts to meet these needs followed the premise that all that was necessary was to identify the individual vehicles automatically and all other management functions could then be carried out in a central computer. This notion belies the fact that a vast amount of data communications with a central data base are then required. In many cases, particularly when operations cover a large geographic area, this approach is both expensive and impractical. In addition, initial encoding of earlier devices was not satisfactory. The device was either factory-programmed, requiring a cross-reference table to relate the arbitrary number to that of the vehicle, or it was field-programmed by physical and/or electric contact, requiring sealing in the field to ensure package integrity.

An alternative to the centralized storage of vehicle data is to store data in the vehicle itself. This requires a system which includes data storage in the vehicle and the ability to change that information. Such systems are disclosed, for example in Baldwin, et al., U.S. Pat. No. 4,870,419 and Cardullo, et al., U.S. Pat. No. 3,713,148. Although these known systems are capable of changing data stored in a moving vehicle, both transmit signals specifying data change, then do nothing to assure that accurate data change actually occurs. Data modification without assured accuracy can result in many vehicles containing inaccurate data to the detriment of both the operators of those vehicles and the traffic control and regulation systems relying on such data.

A need exists for an automatic vehicle identification system having the ability to change the content of memory of a moving vehicle and which provides assurances that such changes are accurately completed.

Also needed is a reader-transponder system which utilizes a multi-function transponder. More specifically a multi-function transponder can cooperate with a reader or an interrogator to perform the following functions with the vehicle in motion:

1) Transmit vehicle identification and other basic data;

2) Accept programming of input data from the interrogator;

3) Communicate with other equipment on board of the vehicle such as a visual display, speed alarm and road advisories; and 4) Work with additional input from the vehicle such as weight on the road as measured by a vehicle road sensor such as disclosed and claimed in C. M. Tromp U.S. Pat. No. 4,799,381 ("Vehicle Road Sensor").

SUMMARY OF THE INVENTION

The present invention provides an electronic identification system that can store both fixed and changing information on a moving object, such as a railroad car, without physical contact and while the object is moving at relatively high speeds. Furthermore, a portion of the information stored on the object can be protected from accidental erasure so that portion cannot be changed without further steps being taken. After a change of non-protected data is requested, an additional read of the data is initiated by the device requesting the change so that the data actually stored in the vehicle can be checked to make certain that the requested change was actually made.

In the case of a highway vehicle, the system provides the vehicle's identity and other pertinent information relating to the vehicle. Some of the information is protected from erasure, such as the identification number, the type of vehicle and loading limits. Other information, such as a toll credit balance and weight as measured by weigh in motion apparatus can be reprogrammed remotely by an interrogation station.

To provide for high speed transmission of information, a memory that can be read and changed and has a number of separate pages to store information is located on the object. Different interrogation stations can then be placed to send encoded interrogation signals to read individual pages of information. Some pages may be protected from erasure as they contain fixed information, while other pages may be remotely changed as desired. By utilizing separate pages in the memory, and more than one interrogation station, more information can be gathered in a shorter space of time, thus allowing higher relative speeds between the object and the interrogation station. The information gathered by the interrogation stations may be transmitted in a computer-compatible format for storage and transmission by existing data communication systems.

Another use for the system is to place electronic identification devices along the path, such as a railroad track, road or highway, and install an interrogation station on a moving vehicle, such as a railroad train, automobile or truck. The electronic identification system of the present invention has an information and identity storage device including a logic circuit and memory, trigger circuit and a transmitter located on the object, with the trigger circuit operating on low power. Upon being triggered by a signal from a remote interrogation station, the transmitter transmits the data into memory in a short series of transmissions. Power for the transmitter is provided by battery but can include other sources of power, such as an inertial generator, electromagnetic generation, induction, visible or infrared light, or by combinations of these power sources. Moving objects can generate power for the transmitter from movement or vibration in a gravitational field. This technique can also be used to extend the life of the battery.

The interrogation station, as well as sending a signal to trigger the trigger circuit, also has a pulse sequence generator to program the memory on the object, a receiver to receive the data from the memory on the object, and an arrangement for checking the accuracy of data received by requesting a readout thereof.

The use of an absolute time source in the information and identity storage device provides for synchronization between the transmitter and the receiver and allows the use of a non-return to zero (NRZ) code format. Alternatively, a free running clock can be used in the system and synchronization can be effected by choice of a suitable code format and appropriate processing in the decoding unit.

This system has the additional advantage of allowing the clock oscillator to be gated off between interrogations with further savings in quiescent power consumption. The data transfer rate for the transmitter should be sufficient to allow for the relative velocity between the object to be identified and the interrogation station.

The information and identity storage devices of automatic vehicle identification systems have to be suitably packaged for protection against weather and environmental conditions and have antennas to allow transmission and receipt of coded signals in suitable locations. In a disclosed embodiment, the vehicle transponder is mounted behind the vehicle license plate to provide secure, easy mounting in a location having good RF exposure to roadway mounted antennas.

The present invention provides an electronic identification system for remotely storing information on an object, and remotely retrieving information from the object. The electronic identification system includes, in combination, an information and identity storage device located on the object, and at least one interrogation station located remotely from the object. The interrogation station is adapted to read data from the information and identity storage device as well as to program it without physical contact. After programming, the data of the vehicle is read to check the accuracy of the re-programming.

The information and identity storage device comprises memory means for storing information and identity data, and protect means for protecting a portion of the memory means against accidental erasure. Logic circuit means for producing a predetermined coded signal representing the information and identity data stored in the memory means has a remote non-contact means for programming the portion of the memory means not protected by the protect means. Transmitter means for transmitting the coded signal is coupled to trigger circuit means which, when triggered, causes the coded signal to be transmitted. A battery power source energizes the other portions of the information and identity storage device.

The interrogation station comprises interrogation signal means for triggering the logic circuit means in the information and identity storage device and pulse sequence generating means for programming the portion of the memory means on the information and identity storage device not protected by the protect means. The interrogation station also has receiver means for receiving the coded signal from the information and identity storage device and synchronization means between the information and identity storage device, and the receiver means. Decoder means for decoding the coded signal, verifies the accuracy of the coded signal, and recovers the information and identity data stored in the memory means of the information and identity storage device and transmitted to the interrogation station. The interrogation station further requests re-transmission of data after a reprogramming request so that the accuracy of reprogramming can be ascertained.

An absolute time source is provided integral with the information and identity storage device, together with synchronization means between this time source and the receiver means. In another embodiment, the memory means has the ability to store a plurality of pages representing the information and identity data, and the logic circuit means can select data from the plurality of pages upon receipt of predetermined timed interrogation pulses from the interrogation station. In yet a further embodiment, the decoder means verifies the accuracy of the coded signal by including an integral count of the number of zeros in the coded signal.

An additional embodiment of the vehicular identification system and the equipment disclosed herein is monitoring highway vehicles' motion on multi-lane highways such as toll roads and expressways. In particular, states of the United States have found it necessary to control heavy truck traffic on interstate highways within their borders. In order to effectively maintain traffic control, in particular, it is necessary and desirable to weigh, identify and accurately communicate with vehicles as they traverse bi-directionally on multi-lane highways. In keeping with the present and future highway speed limit, it is necessary to do this at speeds such as 70 m.p.h. Typically, in order to describe the systems disclosed herein, 120 ft./sec. or 72 m.p.h. will be used, although higher speeds can be accommodated at increased data rates. The use of radio frequency signals from the road surface to high speed vehicles, such as trucks travelling along bidirectional multi-lane highways, presents appreciable application difficulties. As those skilled in the art will recognize, it is necessary to transmit and receive signals from the road surface to each lane of the highway and individually identify each vehicle, although they may be closely spaced, as they travel over a transmitting and receiving antenna located at the highway surface.

BRIEF DESCRIPTION OF THE DRAWINGS

FIG. 7 is a diagram of the identification system of the invention as installed on a bidirectional, four lane highway, particularly showing the location of individual lane triggering and receiver antennas;

FIG. 8A shows a single lane portion of the four lane highway of the type shown in FIG. 7 having positioned therein a 130 kHz. triggering loop and a 2450 MHz. leaky coax antenna;

FIG. 8B shows another single lane portion of the four lane highway of the type shown in FIG. 7 having positioned therein a 130 kHz. triggering loop antenna and a 915 MHz. colinear array receiving antenna;

FIG. 8C shows a single lane portion of the four lane highway of the type shown in FIG. 7 having positioned therein a 915 MHz. colinear array, triggering pulse transmitting and a 915 MHz. colinear array data receiving antenna;

FIG. 8D shows a single lane portion of the four lane highway of the type shown in FIG. 7 having positioned therein a single 915 MHz. colinear array antenna for interrogation, transponder triggering, and transponder signal receiving through the use of a directional coupler;

FIG. 9C is a graphic depiction of the current distribution in the center conductor of the coaxial cable elements of the array of FIG. 9B; FIG. 9D is a further graphic depiction of the current distribution in the sheath of the coaxial cable elements of the antenna of FIG. 9B;

FIG. 10 is a sectional view taken substantially along line 10—10 of FIG. 9, showing details of the colinear array antenna and the reflecting shield;

FIG. 10A is a partly sectional view of the colinear array antenna of FIG. 8D, in an operative position showing details of the radiation signal pattern of the colinear array antenna in a direction parallel with the colinear array;

FIG. 10B is an elevational view of the roadway of FIG. 9, showing the pattern of radiated energy from the colinear array antenna and reflecting shield of FIG. 9;

DETAILED DESCRIPTION OF THE PREFERRED EMBODIMENTS

Figure 1:
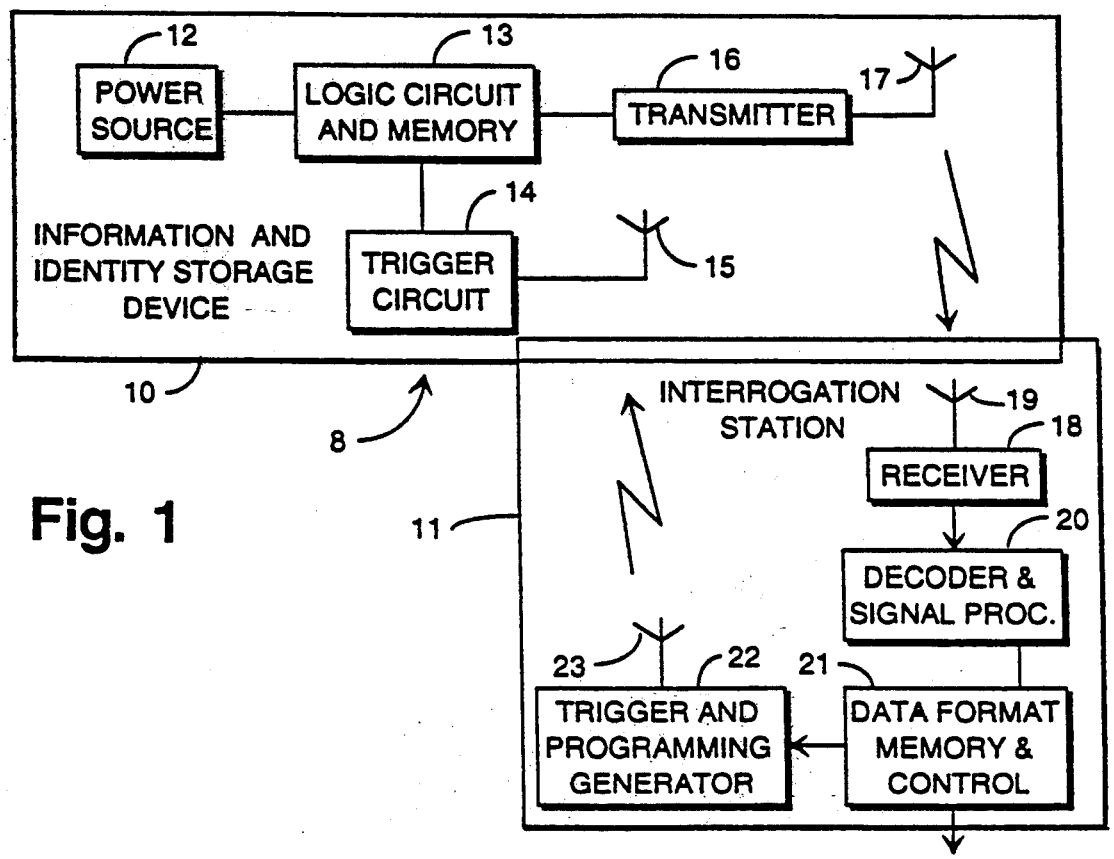
FIG. 1 is a block diagram illustrating an electronic identity system having an information and identity storage device and an interrogation station and embodying the present invention.

Referring now to FIG. 1, an electronic identification system 8 includes a transponder or identification and identity storage device 10 and a fixed transponder or interrogation station 11. The information and identity storage device 10 includes a power source 12, a logic circuit and a memory 13, a receiver and trigger circuit 14 with a first antenna 15, a radio frequency transmitter 16 and a second antenna 17. The interrogation station 11 includes a receiver 18 with an antenna 19 of an antenna array, a decoder 20, a data processor 21, which provides data format memory and control functions, and a trigger interrogation pulse sequence generator and a transmitter 22 with an antenna 23. The data processor 21 aids in the decoding process, formats the data for communication with a central data processing unit (not shown) and generally controls the functions of the interrogation station 11. In general, the complexity of the data processor 21 depends on the particular function which the electronic identification system 8 is required to perform.

The power from the power source 12 for data retention in the memory of the information and identity storage device 10 must be present at all times unless an EEROM is used and so a battery is required. However, the battery could be supplemented by other power sources including energy transfer from inductive or radio frequency energy fields, of which several examples exist in prior art, or inertial field generation as described herein. In many embodiments, of which railroad cars are one example, the power requirements are such that available batteries could provide up to a 20 year operational lifetime without supplemental sources of energy. For those applications where additional energy is required, and where the object requiring data storage is in motion, a means for producing power for data transmission is from the inertial field.

Figure 2:
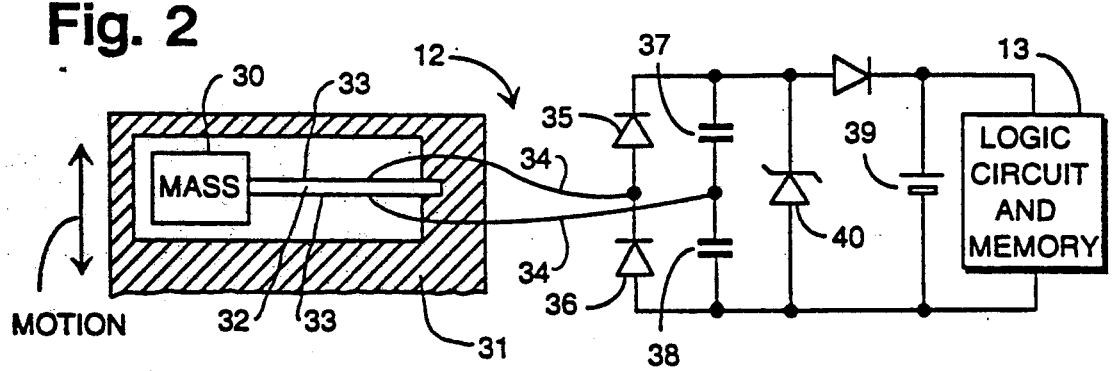
FIG. 2 is a schematic diagram illustrating one embodiment of a vibrationally driven power source for the information and identity storage device of FIG. 1.

FIG. 2 illustrates an inertial energy generator where electric power is derived from the vibration or vertical movement of the moving object. A small mass 30 is shown mounted in a frame 31 on one end of a resilient strip 32. Piezoelectric material 33 is bonded to each side of the strip 32, and a movement of the mass 30, causing deflection of the strip 32, generates an alternating voltage. Leads 34 from the piezoelectric material 33 feed to a circuit where rectification and doubling of the voltage is performed by the diodes 35, 36 and the energy storage capacitors 37, 38. Alternatively, an ordinary full-wave or half-wave rectifier may be used if the higher voltage is not required. The direct current energy either can be stored in the capacitors 37, 38 or in a rechargeable battery 39. A means for limiting the maximum voltage is provided in the form of a Zener diode 40, by a number of diodes in series, or by a voltage regulator circuit.

The contents of the memory are maintained by the battery power source 12 which provides sufficient energy to the transmitter 16 so that the coded signal is completely transmitted before the stored power drops low enough to stop the data transmission. The transmitter 16 draws little power from the power source 12, in its quiescent state, allowing excess generated energy from the power source 12 to be stored for later transmission. The data to be transmitted from the information and identity storage device 10 must be formatted in such a way that the desired information is conveyed accurately. While the following scheme is the preferred embodiment for marking railroad cars, a number of variations are possible. In general, the data will contain coded information to designate the owner of the car and the car's serial number in a protected portion of the memory.

Data bits can be coded in various ways. For North American railroad applications, where cars associated with various owners are intermixed, a code is allocated to the protected portion of the memory frame as follows:
9 bits: represent car owner
20 bits: represent car serial number
5 bits: are used as a check
(0 count)

The data code stream contains either a means of self-synchronization relying on the code format, or an external or inherent method of synchronization is provided. In one embodiment, synchronization in some form is provided at the interrogation station 11 to clock the identification device 10. An alternative solution is to provide an absolute time source such as a clock, with the identification device 10. The clock should be stable enough so that synchronization of the second independent clock in the interrogation station 11 is maintained within a single bit interval for the period of time required to transmit the coded signal from the moving information and identity storage device 10 to the stationary interrogation station 11. The availability of low cost, accurate timing crystals for wristwatch manufacture make the use of a non-return to zero (NRZ) code feasible for the code signal since the timing is predictable enough for data recovery. The low power consumption of these devices allows lifetimes of up to 20 years on available batteries.

One operating feature of the information and identity storage device 10 is the code rate employed for the coded signal. High code rates allow for many read operations at high vehicle speeds, but are more difficult to decode and consume more power. Typical microwave antennas allow a reading window of about 300 mm. A transmitter spends about 3.5 milliseconds in this window when traveling at 320 km./hr. Assuming at least three transmissions to be received, the total time for each transmission would be about one millisecond. A typical transmission comprises eight preamble bits and sixty four data bits so that a sufficient code rate is about 64 kHz. Doubling the frequency of a watch crystal provides a convenient rate of 65.5 kHz. with acceptably low power. At more common railroad and highway speeds such as 100 km./hr., the transmitter can be read approximately ten times with consequent improvement in accuracy. In order to read four sixty four bit pages of data, or two hundred fifty six bits three times in less than 3.5 milliseconds, the maximum transponder carrying vehicle speed is 80 km./hr., which is more than adequate for those locations at which this quantity of information is required. With this code rate, spacing of information and identity storage devices 10 on adjacent railway cars can be of the order of a meter without any difficulty.

Increased data rates for use with high speed vehicles or vehicles traveling multiple lane roadways or tracks can be provided by the transponder 10 and interrogator or reader 11 disclosed herein, and will be later described.

Figure 3:
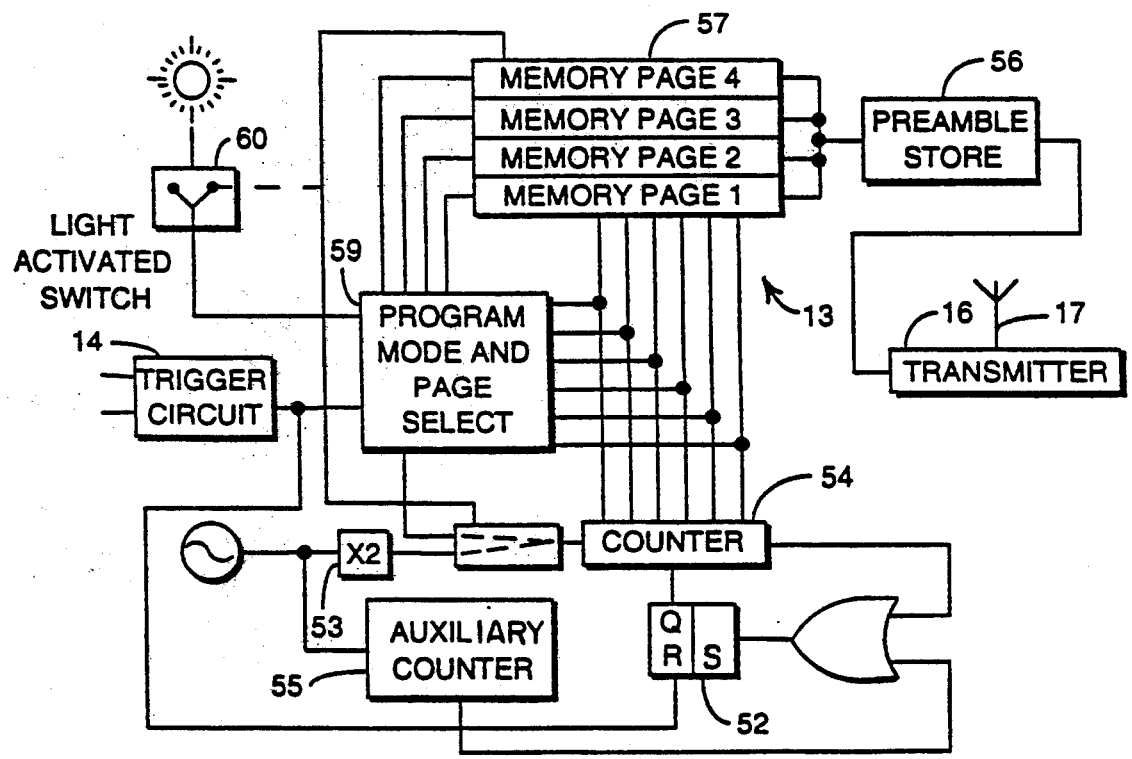
FIG. 3 is a block diagram of a logic circuit in the information and identity storage device of FIG. 1.

A block diagram of the logic circuit 13 is shown in FIG. 3. The logic circuit 13 will be familiar to those skilled in the art. To achieve the very low current consumption required, the entire information and identity storage device 10 is realized in a single CMOS integrated circuit or circuits. In response to a trigger impulse, the trigger circuit 14 resets the flip-flop 52 and the counters 53 and 54 and auxiliary counter 55 are allowed to count. Counter 54 sequentially selects memory addresses which cause the contents of the preamble store 56 and the first memory page 57 to be output through the transmitter 16 to the antenna 17, which consequentially sends out a coded signal. At various precise time points during the transmission, the program mode and page select circuit 59 allows memory paging or programming mode entry. Access to the first thirty four bits is controlled by the light-activated switch 60. Data entry is also through the trigger circuit 14. The information and identity storage device 10 is returned to its quiescent state either when counter 54 reaches the end of its count, signifying that all bits have been sent, or when auxiliary counter 55 ends its count.

The trigger circuit 14 may take one of several forms depending on the specific application. The characteristics of the trigger circuit 14 are as follows:
1. High input impedance.
2. A threshold level of voltage which must be exceeded in order to initiate the transmission.
3. Trigger initiation is effected by an impulse rather than a steady state condition.
4. The trigger circuit is passive in the sense that its operational power is obtained from the triggering signal and it consumes no energy in the quiescent state.

Figure 4:
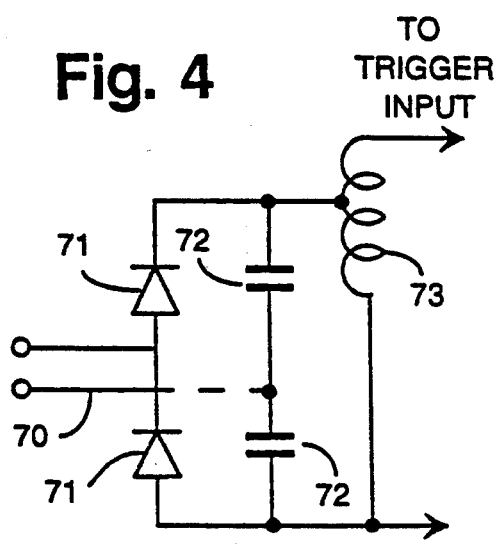
FIG. 4 is a schematic diagram of a microwave triggered circuit of the information and identity storage device of FIG. 1.

Energy may be provided to trigger circuit 14 in various forms such as electromagnetic, magnetic, infrared, ultrasonic or pressure. In one embodiment used in the railroad environment, a burst of microwave energy is used as an interrogation signal. FIG. 4 shows a trigger circuit suitable for receiving an interrogation signal 70 in the form of electromagnetic radiation, demodulating the burst with diodes 71 and capacitors 72 and matching the appropriate input impedance With a pulse transformer 73.

In order to access the additional pages of memory, a timed sequence of interrogation pulses is sent. A different sequence of pulses allows the memory to be written to, this access only being permitted to "write protected" portions of memory unless the protect switch is illuminated. The individual bits of memory are also programmed using appropriately timed interrogation pulses.

Included in the information and identity storage device or transponder 10 are two antennas 15 and 17. These could take various forms but in one embodiment, they operate at microwave frequencies. Both antennas 15 and 17 and also all other circuitry in the device are mounted on a sheet of low loss material. The antennas may consist of patches or arrays of patches of conductive material whose design would be familiar with ones skilled in the art. The configuration of the patches is dependent on the frequency of operation and the desired antenna patterns. One antenna is associated with the trigger circuit 14 described above, and the other is connected to the transmitter 16, which is a single stage device arranged to produce energy at the desired frequency. A power output of one to ten milliwatts is more than sufficient for reliable operation of the electronic identification system 8. In general, the operating frequencies of the data link and the triggering link are different, but since the trigger circuit and the data circuit do not transmit at the same time, they may be the same.

Figure 5:
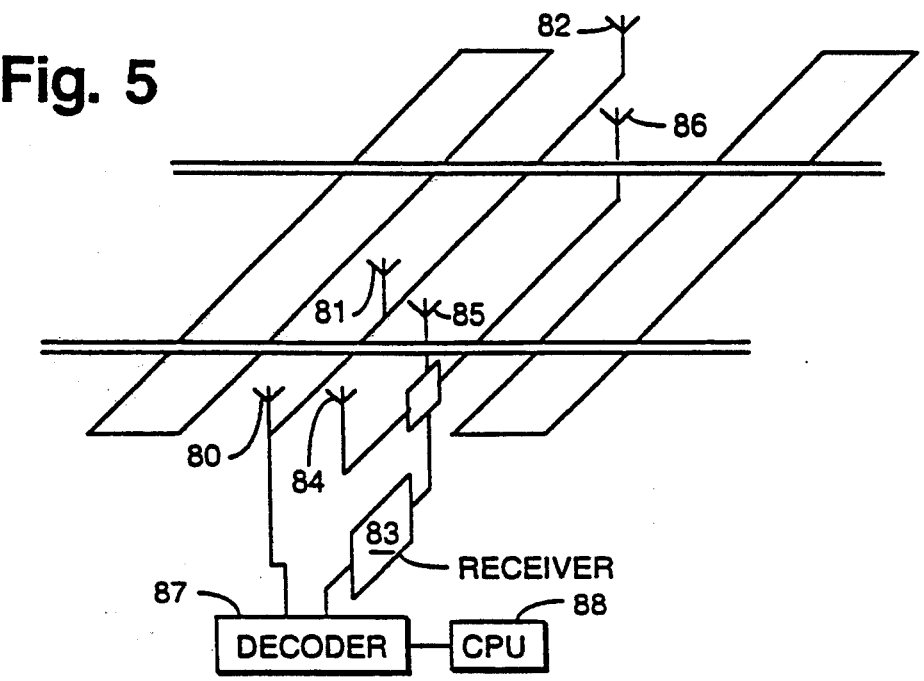
FIG. 5 is a block diagram of the interrogation station of FIG. 1.
Figure 6:
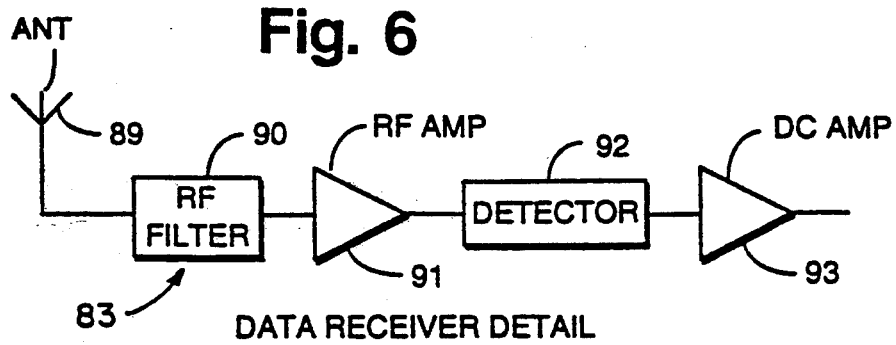
FIG. 6 is a block diagram showing the coded signal receiver of the interrogation station of FIG. 5.

FIG. 5 illustrates a more detailed arrangement of the interrogation station 11. The embodiment shown represents one configuration suitable for railroad applications. Alternative interrogation stations and receiving antennas may be employed. Three microwave interrogator signal sources with antennas 80, 81 and 82 are shown. One is located on each side and one between the two ties of the railroad track to allow reading of the information and identity storage devices on either side or under the cars. A coded signal receiver 83, which is similar to the receiver 18, with antennas 84, 85 and 86 on either side in between the tracks is located beside the track along with the rest of the interrogation equipment 87, 88. The receiver 83 is shown in more detail in FIG. 6 and has an antenna 89, an RF filter 90, RF amplifier 91, a detector 92, and a DC amplifier 93. The operating frequency in the railroad application is chosen to minimize noise and unwanted signals and is typically in the 2500 MHz region although other frequencies such as 915 MHz. can be used as well. Detected and amplified signals from the receiver 83 are fed to the decoder 87 and microprocessor system 88 where they are checked for accuracy and stored or transmitted to a host computer as required. Synchronization with the transmitter 16 takes place in the decoder circuit 86 which has an absolute time reference on the same frequency as the transmitter 16.

In one embodiment of the system, wheel contacts provide supplemental information such as speed and direction of the train. Wheel contacts indicate when the whole train has passed, and at this time the data is assembled in a format compatible with the central data processor to which it is sent either in response to an interrogation or on its own request. It is also possible to use reflected signals from the interrogating beam to determine the speed and direction of the vehicle using the Doppler effect.

As indicated earlier and above, the electronic vehicular identification system 8 disclosed herein may also be used to identify moving vehicles on multi-lane highways, however, substantial difficulty may be encountered due to random arrival of vehicles at the reading or interrogating station 11, and in particular, movement of the vehicle's transponder 10 over an interrogating loop or antenna. Since there is a high probability that multi-vehicle traffic will be simultaneously present at the interrogating antenna location, in order to properly monitor road traffic at a given point, it is necessary to distinguish not only between successive vehicles in a given lane, but to distinguish the particular lane occupied by a given vehicle that passes over the interrogation antenna. In order to provide the type of roadway monitoring currently required by state highway authorities, the present invention provides an apparatus and a method which provide positive identification of vehicles travelling in the same and opposite directions along multi-lane highways. Typically, in a given monitoring situation two to four lanes are monitored with identification of vehicles having a nominal transponder spacing of 3 feet traveling at typical speeds of 70 m.p.h. As will be discussed, however, vehicle speed and transponder spacing can be varied through the use of greater data rates.

Figure 12:
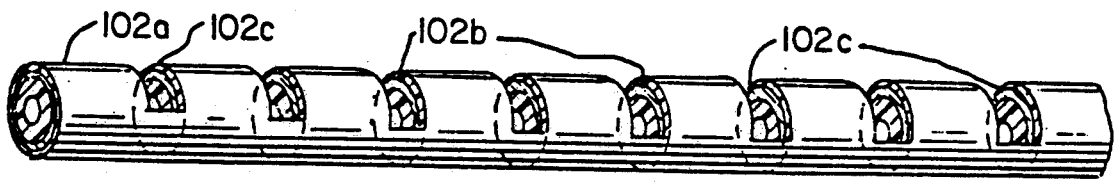
FIG. 12 is an isometric view of one form of a leaky coax radiating element.

In particular, with reference to FIGS. 7 and 8A through 8D, various single lane embodiments of the highway signal transmitting and receiving systems of the invention are shown therein. FIG. 7 shows in diagrammatic form, a typical multi-lane highway installation wherein four lanes of opposing direction traffic 101 and 103 travel along a highway 109. In the specific lane configuration of FIG. 8A, there is buried in the surface of the roadway, a colinear triggering antenna or alternately a triggering loop antenna 100 typically radiating at a frequency of 130 kHz., and a colinear antenna array 102, radiating or receiving at a frequency of 2450 MHz. The colinear antenna array 102 will be known to those skilled in the art as leaky coax, as disclosed in U.S. Pat. No. 3,691,488, the disclosure of which is incorporated herein by reference. It comprises a coaxial cable 102a, as may best be seen in FIG. 12, having a perforated outer conductor 102b for radiation of electromagnetic energy through a plurality of openings 102c therein.

Systems using a loop trigger antenna and microwave colinear antenna can also operate the loop at 130 kHz., with microwave colinear receiving antenna 102 operating at 915 MHz. and other colinear antenna arrays as shown in FIGS. 8A, 8B, 8C, and 8D. FIGS. 10A, and 10B show the signal intensity of radiation pattern of the operating colinear array antenna 102. As shown, the signal intensity pattern defines a transponder capture zone.

The system of FIG. 7 utilizes individual lane triggering antennas 100, and receiving antennas 102, as will be discussed later.

Although the following description is framed on the loop trigger operating antenna configuration of FIGS. 7, 8A, and 8B, the lane configurations of 8C, or 8D would function equally as well, and are considered equivalent systems.

Figure 11:
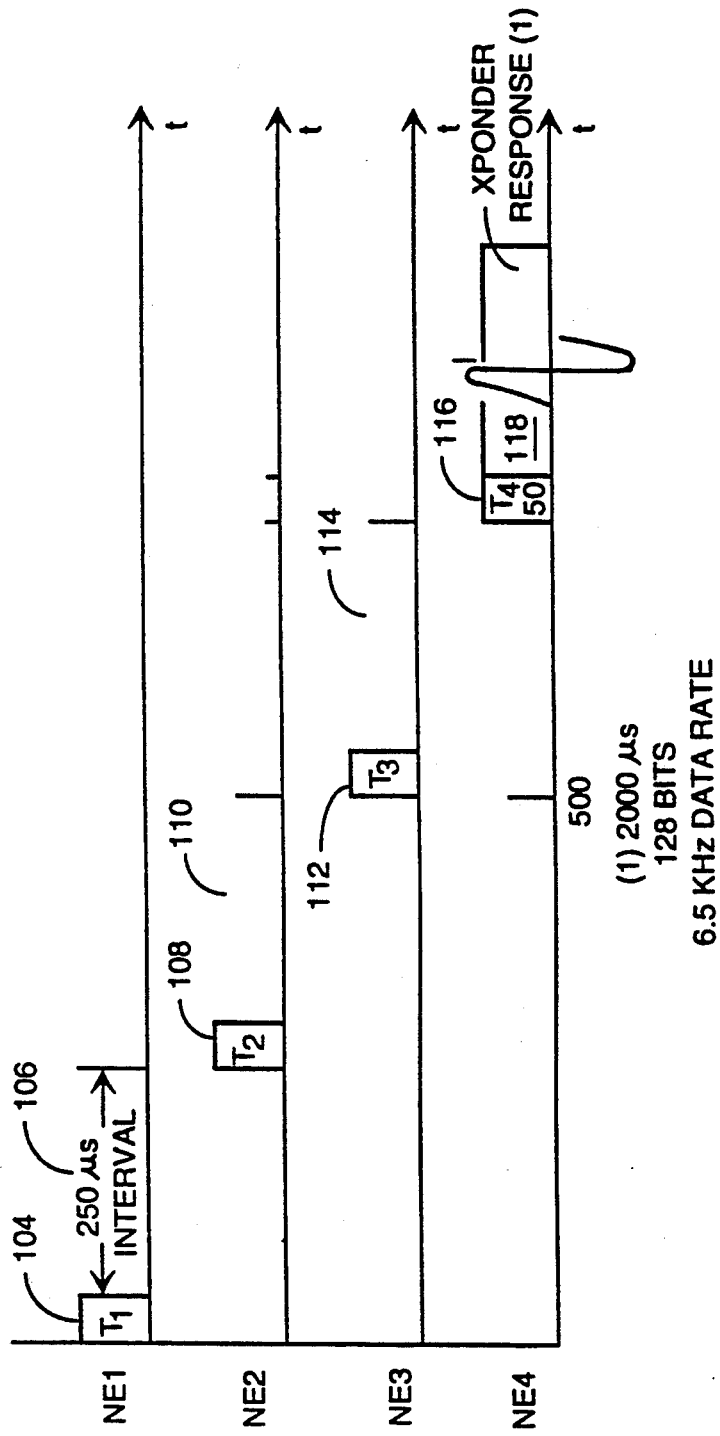
FIG. 11 is a diagrammatic representation of the sequence of triggering and data pulses transmitted and received by an interrogation station positioned adjacent a fourth lane of a four lane highway.

In operation, and with inclusive reference to FIGS. 7 and 11, there is a transponder interrogating or triggering pulse 104 transmitted by a triggering antenna or loop 100. After a transponder response interval 106, typically 250 microseconds, if no transponder response is received by the antenna 102, interrogator or reader 120 (Reference FIG. 7) stores the non-response indicating an interrogating transmission on lane 1. The second interrogating pulse 108, noted as lane 2, is transmitted from the antenna 100, and if no transponder response is received during the interval 110, a third interrogator pulse 112, noted as lane 3, is transmitted with an additional wait for a receiving period 114. As shown, the fourth interrogating pulse 116, noted as lane 4, is transmitted and receives a transponder response 118. On receipt of the transponder response, the transmitted interrogating pulse is delayed by 2,000 microseconds in order to provide additional time to receive a transponder message, typically containing 128 information bits, at a data rate of 65 kHz.

The "record keeping" i.e., lane counting, and redundant reads in the case of improper data reception is under the control of an interrogator 120. This approach provides successful monitoring for moving vehicles in multi-lane roadways. The electronic identification system 8 operates under conditions wherein there is a nominal spacing between transponders 10 in any lane configuration on vehicles moving at rates of 120 feet per second, or 72 m.p.h. The invention further provides an antenna having a transponder capture or zone of approximately three feet along the path of the moving vehicle. With this configuration, information data rates of 65 kHz. and vehicle speeds, each lane's capture zone is occupied by a given vehicular transponder for at least 30 milliseconds. At the above-mentioned data rate of 65 kHz., a 128 bit message received from the transponder can be received in approximately two milliseconds, providing a large time interval where multiple reads of the same transponder 10 can be obtained in order to improve the statistical return signal accuracy.

In another particular embodiment of the invention, a leaky coax antenna is operated at a frequency of 2450 MHz. However, as will be further described, the use of available lower frequencies, typically 915 MHz. for both triggering and data transfer from the data transponder 10 allows read intervals adequate to insure accurate detection and identification of the moving vehicles.

Although the above described system operates at a data rate of 65 kHz. or kilobytes per second, and a carrier frequency of 915 MHz., this invention discloses the discovery that equivalent operation can be achieved at data rates of 500 kHz. or kilobytes per second. This provides a relatively large increase in the effective capture zone of the particular colinear antenna configuration shown in FIGS. 10A and 10B, thereby allowing vehicular speeds in the vicinity of 100 m.p.h., and more importantly provides a system capability of multiple transponder read cycles for essentially simultaneous occupancy of a multiple lane highway by vehicles which may be moving in either direction.

FIGS. 7 and 8A further show an interrogator or reader 120 in signal communication with an antenna or loop 100 and the antenna 102. This arrangement is common to roadway interrogating stations disclosed, providing communication and information processing between road antennae, and auxiliary computing equipment.

In an additional embodiment of the invention, the lane configuration of FIG. 8B consists of interrogator trigger loop alternate 120, which is similar to the loop 100 discussed above, for delivering a trigger or turn-on pulse at 130 kHz. Also used, as may best be seen in FIGS. 8B and 11, is a colinear antenna array 122 utilized as an antenna for receiving a transponder signal 118 during the transponder response interval 106 to the triggering pulse 116 transmitted by the loop 120. Use of the colinear antenna array 122, provides an advance in the art of transponder communication, in that receiving signal strength from the transponder 10 is greatly improved.

With reference to FIG. 8C, yet an additional embodiment of the invention comprises parallel colinear array antennas for transmitting a trigger pulse from one array and interrogating a mobile transceiver 10 and receiving the transponder signal from the other. The configuration of FIG. 8C is placed in and substituted for the loop 100 and colinear antenna 102 of FIG. 7. Replacement of the interrogating loops 100 and/or 120 by a colinear transmitter array 122 provides an advantage in that the antenna 122 provides signal gain and directivity from the interrogation station 11 to the transponder 10 for transmitting trigger pulses to, in reprogramming the transponder 10. Similarly, the colinear array receiving antenna 122 provides increased directivity and signal gain for data received from the low power transponder 10.

A further embodiment of the invention disclosed herein is shown in the individual lane element of FIG. 8D. As shown, a single colinear array operating at 915 MHz is used for both transmitting and receiving with the use of a microwave directional coupler or circulator 126 wherein the triggering and interrogation signal is supplied by a conductor 127 and transponder response signals are received via the conductor 127. This configuration is a further advance in the art of identifying and communication with moving vehicles in that only a single roadway groove is required.

The use of 915 MHz. as a communication frequency for the electronic identification system is dictated by the availability of this frequency for devices of this type. As such, it is a reasonable compromise with respect to interference from other services and devices, debris penetration, and availability of components at reasonable cost.

As discussed above, the colinear array suitable for installation in the roadway surface has provided signal directivity and gain in the direction upwards of the road surface. In particular, as may best be seen in FIGS. 9 and 10, the antenna consists of the colinear array assembly 122 consisting of a colinear element array 124, as may best be seen in FIG. 9A, mounted internally of a U-shaped open channel or shell comprising a reflective shield 123. An antenna array 124 comprised of coaxial cable is mounted in the channel 123 inside a protective tubular housing 128 mounted somewhat centrally and internal of the reflective shield 123. Surrounding the outer surfaces of the tubular housing 128, is a dielectric material 130 filling the reflective shield. The use of a material having a dielectric constant greater than 1.0 and high compressive strength, water resistance, and the ability to bond to both the reflective shield 123 and the housing 128, improves signal transmission by increasing the signal strength above the roadway, and provides protection from the vehicles on the road.

Figure 9:
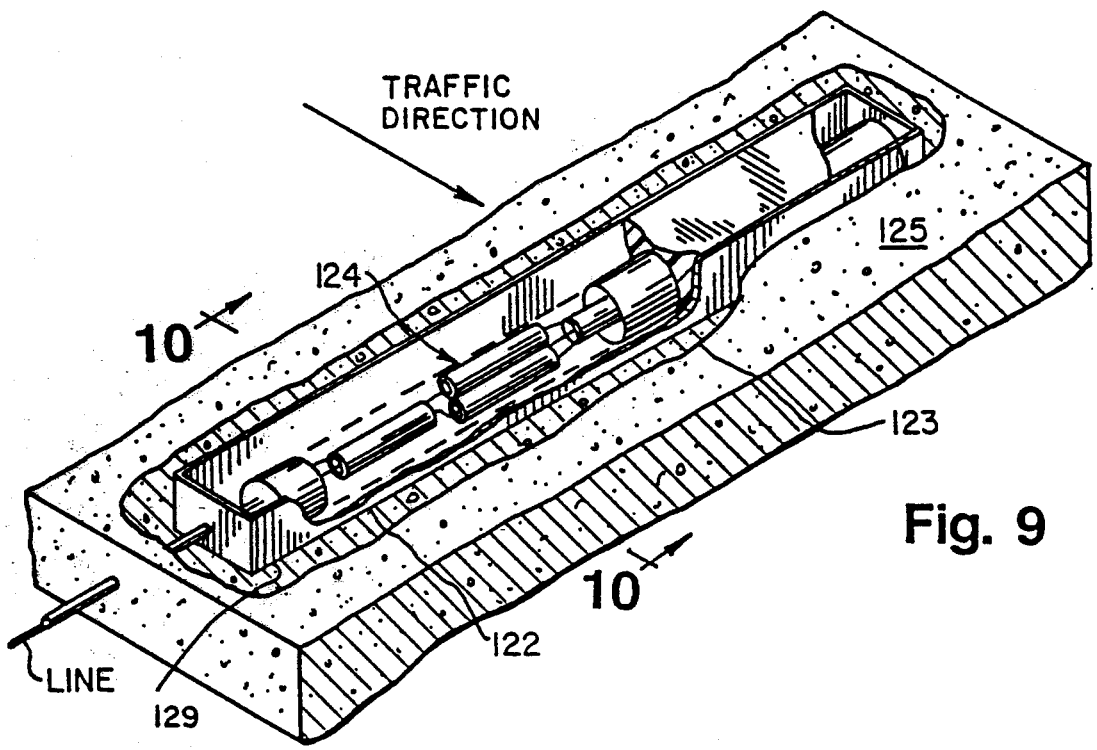
FIG. 9 is an isometric view of the antenna and a reflective shield or channel housing embodying the present invention, showing details of the positioning of the channel in a roadway of a highway and the position of the antenna in the channel.
Figure 9A:
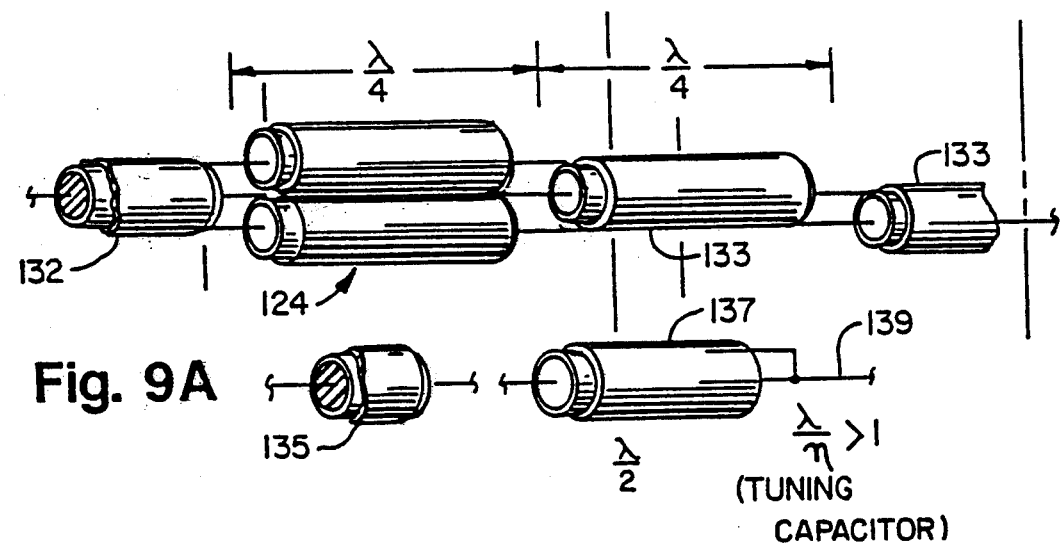
FIG. 9A is an isometric view of the colinear array antenna of FIG. 9, showing further details of its construction.
Figure 9B:
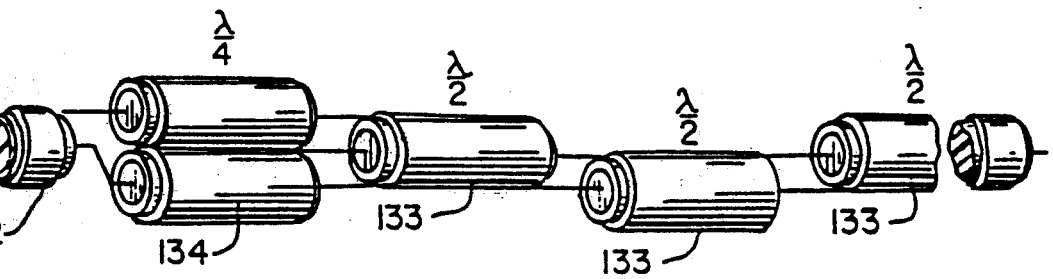
FIG. 9B is an additional depiction of a portion of the colinear array of FIG. 9A, showing two complete elements and a partial element constructed from coaxial cable.

As those skilled in the antenna arts will readily recognize, use of relatively low loss dielectric materials having dielectric constants greater than 1 reduces the wavelengths of electromagnetic transmissions through the medium. In this case use of the material having a dielectric constant of approximately 2.5 tends to reduce the wavelength of the transmitted signal by a factor of about 1.5. The effect of this wavelength reduction is to effectively bring the antenna to shield or trough distance closer to a half wavelength at 915 MHz., thereby increasing the effectiveness of the shield in reflecting radiation toward its open end thereby increasing the signal strength of upward radiation. As shown in FIG. 10, the antenna array 124 is laterally centered closer to the road surface 125 than the bottom of the metal shield 123, substantially increasing the radiated signal upwards through the shield open end and upward from the road surface 125. The disclosed antenna further provides an advantage in that the reflective shield 123 eliminates any dependence on the dielectric constant or radio frequency characteristics of commonly used pavements, resulting in predictable performance in roadways having highly variable radio frequency loss characteristics. In a specific embodiment of the invention, the reflective channel of FIG. 10 comprises a metal shield having a three-inch width, with the colinear antenna assembly 124 disposed equidistant from the sides of the shield 123 and approximately one inch from the lower surface. The channel is cemented or retained in a roadway groove, after which the antenna assembly properly supported from one edge of the road to the other is, "potted" with dielectric material 130 in the metal shield 123, as shown in FIGS. 9 and 10.

The improvement in radiating signal characteristics of the colinear array disclosed herein is particularly shown in FIGS. 10A and 10B. In providing a relatively uniform radiation pattern across the roadway shown in FIG. 10A, provides improved responses from vehicular transponders 10 operating near the edge of the road. The radiation pattern, or transponder zone capture of the antenna shown in FIG. 10B increases the occupancy time of moving transponders providing, as discussed above, an improved accuracy in data transfer from low power transponders to interrogator.

In reference to FIG. 9A, 9B, 9C, and 9D there is shown a detailed depiction of a typical portion of the colinear array 124. As those skilled in the antenna arts will readily perceive, one embodiment utilizes lengths of coaxial cable cut to one-half wavelength at the operating frequency and connected conductor-to-shell, as shown, in order to obtain the required phase reversal in each other half-wave section, resulting in a plurality of in-phase radiating elements which increases the radiated signal strength over that provided by an identical number of dipoles. A unique advantage of the colinear array 124, as incorporated in a road antenna in this invention, lies in its completely modular construction. It is possible to utilize this antenna construction in identifying vehicles over roads having varying widths and numbers of lanes by merely adding additional half-wave sections.

The theory and operation of the colinear array antenna of the invention are described in *Transmission Lines, Antennas, & Wave Guides*, King, Mimno & Wing, McGraw-Hill Book Co., pp. 133-145.

At the input end 132 of the antenna assembly 124, there is shown a quarter-wave matching stub 134. Also at the free end of the antenna 135, there is an additional quarter-wave matching stub 137 having an additional capacitive end 139. Those skilled in the art will readily understand applicant's discovery of a colinear array in cooperation with a reflecting shield providing an advance in the state of the art of vehicle identification through transmission and reception of radio frequency signals to and from the road surface. At the input end 132 of the antenna assembly 124, there is shown a quarter-wave matching stub 134. Also at the free end of the antenna 135, there is an additional quarter-wave matching stub 137 having an additional capacitive end 139.

Figure 18:
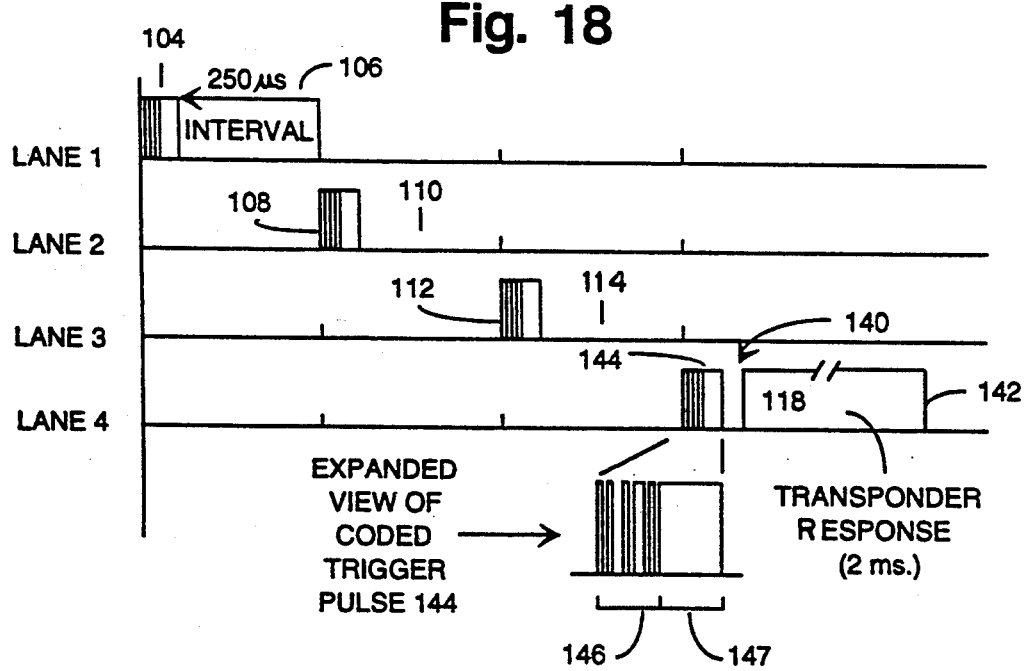
FIG. 18 is a diagrammatic representation of the use of trigger pulses to convey data.

A further portion of the invention disclosed, as may best be seen in FIG. 18 which is presented as an alternative embodiment to that shown in FIG. 11. In addition to triggering a vehicle mounted transponder in order to record and store its fixed identification, the reader or interrogator can encode data into the trigger pulse in order to transmit additional data to the transponder 10.

As discussed above, individual transponders 10 are activated in a multi-lane situation by a time-multiplexed trigger pulse, i.e., pulses 104, 108, 112 and 116 as may best be seen in the four-lane example in FIG. 11. Additional information may be transmitted to the transponder from the interrogation station 11 by encoding data into the trigger pulse at a data rate substantially higher than the transponder data rate. Accordingly, in one such embodiment, the trigger signal 144 transmitted from the interrogation station 11 comprises a 25 microsecond coded portion 146 at a data rate of 1 MHz, followed by a 25 microsecond uncoded pulse 147. Typically, the information transmitted to the transponder in this manner would be passed on to other systems or devices in the vehicle, including but not limited to a dashboard display. Those skilled in the art will understand that this dashboard display can take many forms including gas discharge displays and/or onboard cathode ray tube monitors. Information transmitted in this manner typically can be road conditions, geographic positional data, emergency information for driver reaction or changing speed limits.

Figure 17:
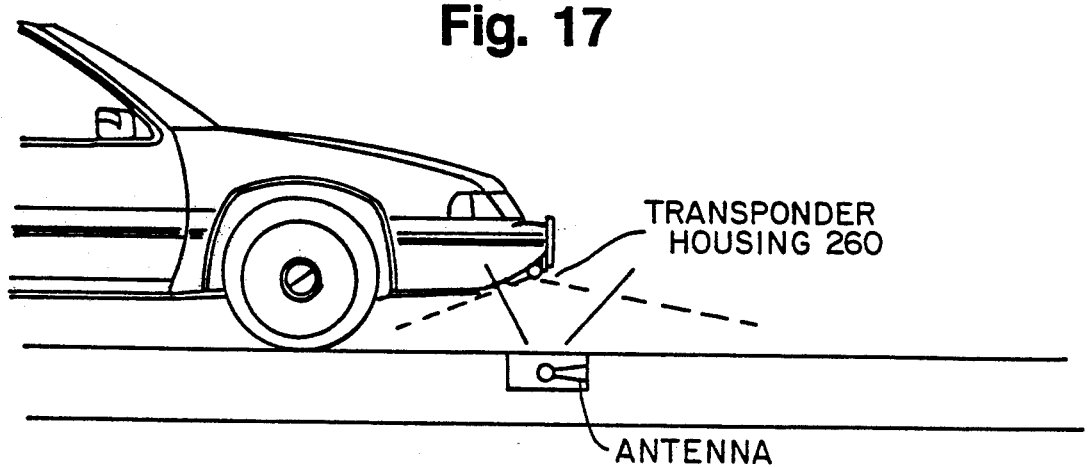
FIG. 17 illustrates an embodiment the advantageous placement of the vehicle antenna on the vehicle license plate.

The placement of the vehicle antenna for signal exchange with roadway surface antennas is also important. Mounting the antenna to a vehicle license plate as shown in FIG. 17 has been found to provide significant advantages. In FIG. 17, the antenna is a part of the transponder housing 260 and is mounted to the front license plate of a car. Mounting on the license plate is relatively simple and provides a secure antenna location having good RF exposure to road surface antennas.

The preceding embodiments have shown in detail arrangements including interrogator 11 and an information and identity storage device or transponder 10 and their cooperative interaction. Included in their interaction is the ability of the interrogation station 11 to program or change memory 57 of transponder 10. In many cases, such memory changes are of great importance to the proper record keeping of the system. For example, when the data to be change represents the current weight of the vehicle as measured by a weigh in motion device (WIM), the stored data may become the basis of road taxes or overweight penalties. Accordingly, proper recording of such data is of extreme importance.

Data exchange in the present system is difficult and subject to many types of possible error. This is especially true when communication is with objects moving at perhaps 100 miles an hour, yielding only perhaps 25 milliseconds to convey data and insure the accuracy of its transmission, reception and processing. The present embodiment presents new methods and apparatus of operating the interrogator 11 and transponder 10 to provide necessary security in data handling. The apparatus of the present embodiment varies from that of previous disclosed embodiments in that the functions performed thereby are changed. As will be understood by those of ordinary skill in the art, such new functions can be easily provided by well known time and signal responsive circuitry or by a computerized controller programmed to respond to signals and the passage of time.

Figure 13:
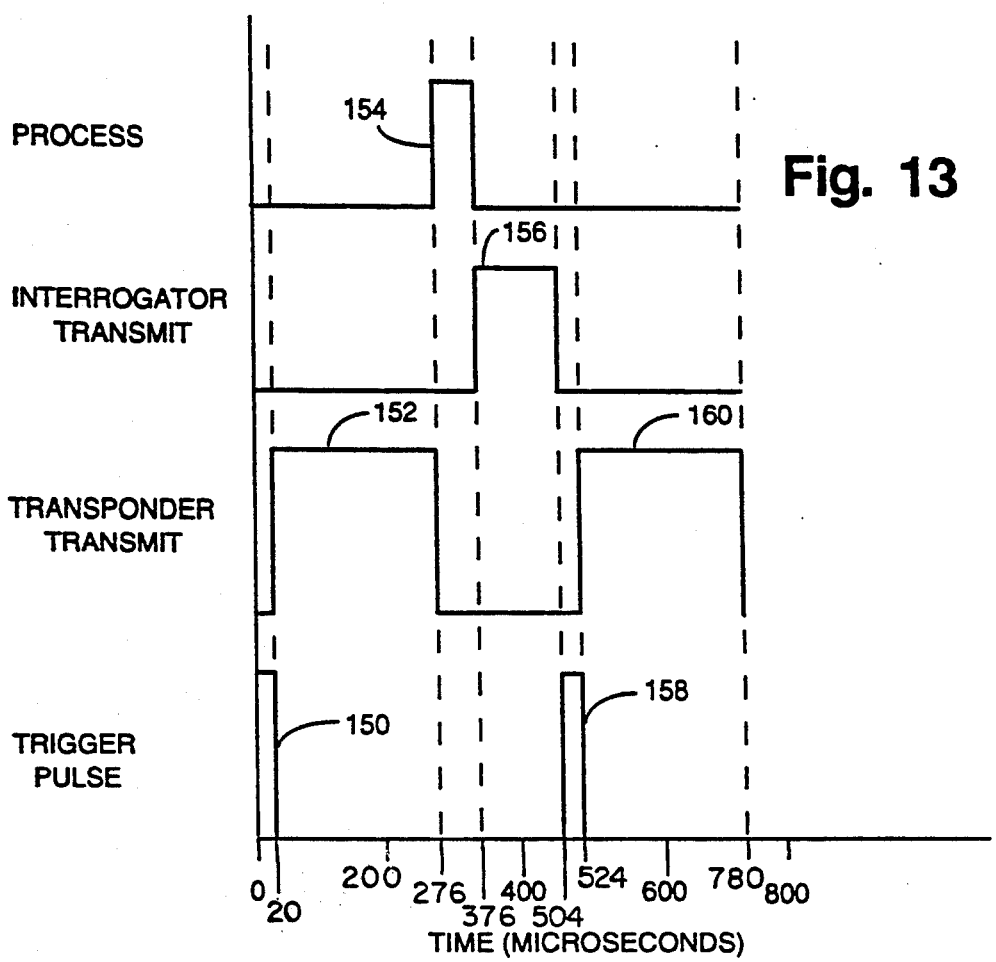
FIG. 13 is a timing diagram of information exchange between an interrogator and transponder of an embodiment.

FIG. 13 is a timing diagram showing the timed relationship of the signals exchanged in the present embodiment. This timed relationship and the data transmission rates employed, provide a system in which an interrogator can read the information stored in a moving transponder, process the information, program new information into the transponder memory based on the priorly read information and read the newly programmed information to assure its accuracy of storage. The present per-lane sequence (FIG. 13) can be used with priorly discussed multiplexing techniques so that one interrogator 11 can sequentially communicate with eight different moving transponders each in a different physical location (highway lane) and three complete accesses of the type above can be made within the capture window of the system.

FIG. 13 shows a sequence of operations undertaken for a single lane of traffic flow and includes operations undertaken by both the interrogator 11 and the transponder 10. Interrogator 11 periodically transmits first trigger pulses 150 which go unused until a transponder is within the capture window of the system. When a transponder is in the vicinity of a trigger pulse 150, it automatically responds by transmitting a first data message comprising 128 bits from its memory 57 as is represented at 152. (152 also represents a reception interval by the interrogator 11). Interrogator 11 then processes the received data during interval 154 to make sure of the accuracy of its reception and to determine what new data is to be written into transponder 10. For example, if the data read from transponder 10 in 152 consists of a credit balance for the payment of road use tolls, interrogator 11, during processing 154 will subtract the most recent toll from the credit balance. A second data message including the processed data is then written from interrogator 11 to transponder 10 in the time designated 156. Since the original transmission 152 from the transponder 10 includes fixed data concerning the vehicle associated with the transponder, the return message 156 is substantially shorter since this fixed data need not be re-transmitted. The data received by transponder 10 during interval 156 is stored into the memory of transponder 10 upon reception. The next signal transmitted in the present embodiment is a second trigger pulse 158 which is transmitted by interrogator 11 a predetermined period of time after the transmission of trigger pulse 150. That is, trigger pulse 158 is transmitted at such a time that the information transmitted to transponder (156) will be stored in the memory of transponder 10 prior to the transponder's response to trigger pulse 158. In response to trigger pulse 158, transponder 10 transmits from its memory a third data message 160 which represents the content of its memory as modified by the recent transmission 156 from interrogator 11. Interrogator 11 then checks the content of the data 160 to make sure that the data accurately represents the changed data 156. In accordance with the preceding example, the data in the moving transponder 10 was read by interrogator 11, modified by interrogator 11 and reread by interrogator 11 to guarantee that the modifications have been accurately stored.

The diagram of FIG. 13 shows a cooperative information exchange between an interrogator 11 and a transponder 10 in a single lane of traffic. At the end of the sequence shown in FIG. 13, the same sequence will begin again in another lane of traffic to perform the same operations with any transponder within the capture window in that lane. The process continues through each successive surveyed lane of traffic up to, for example, eight, and then begins again with the first lane of traffic. The use of appropriate timing intervals and data rates assures that eight lanes of traffic can be scanned as shown in FIG. 13 and at least three complete scan cycles will be performed for each lane. Performance of this sequence three times per lane provides greater assurance of accuracy of the cooperative action.

In the present embodiment, the transmitting and receiving frequency is the previously discussed 915 megahertz and the rate of data transfer is 500 K-bits per second. Each transmission from transponder 10 (152 and 156, FIG. 13) comprises 128 bits (256 microseconds at 500 per second) which includes 64 bits of memory protected vehicle identification information and 64 bits of changeable data such as vehicle weight and/or toll credit balance. The transmission (156, FIG. 13) from interrogator 11 comprises 64 bits (128 microseconds) of changeable data for the vehicle identified in the 128 bit transmission 152. Further, trigger pulses 150 and 158 each last 20 microseconds and the processing period 154 lasts 100 microseconds.

The dotted vertical lines of FIG. 13 identify the specific times at which events occur and each is labelled with a specific time in microseconds measured from the start of trigger pulse 150. As shown, the sequence for each lane requires 785 microseconds when a five microsecond period is blanked between the end of one sequence and the trigger pulse 150 starting the sequence in the next lane. Scanning eight lanes of traffic three times each requires 24 lane scan periods of the type shown in FIG. 13 or approximately 18.84 milliseconds. A vehicle travelling at 100 miles per hour covers approximately 2.75 feet in 18.84 milliseconds. So a transponder and interrogator antenna system with a capture zone in access of 2.75 feet used as above described, provides three secure data exchange cycles in each active lane of traffic. When the capture zone is constructed to be three or perhaps four feet as is achievable with current antenna technology, the security of data exchange is further improved.

Figure 14:
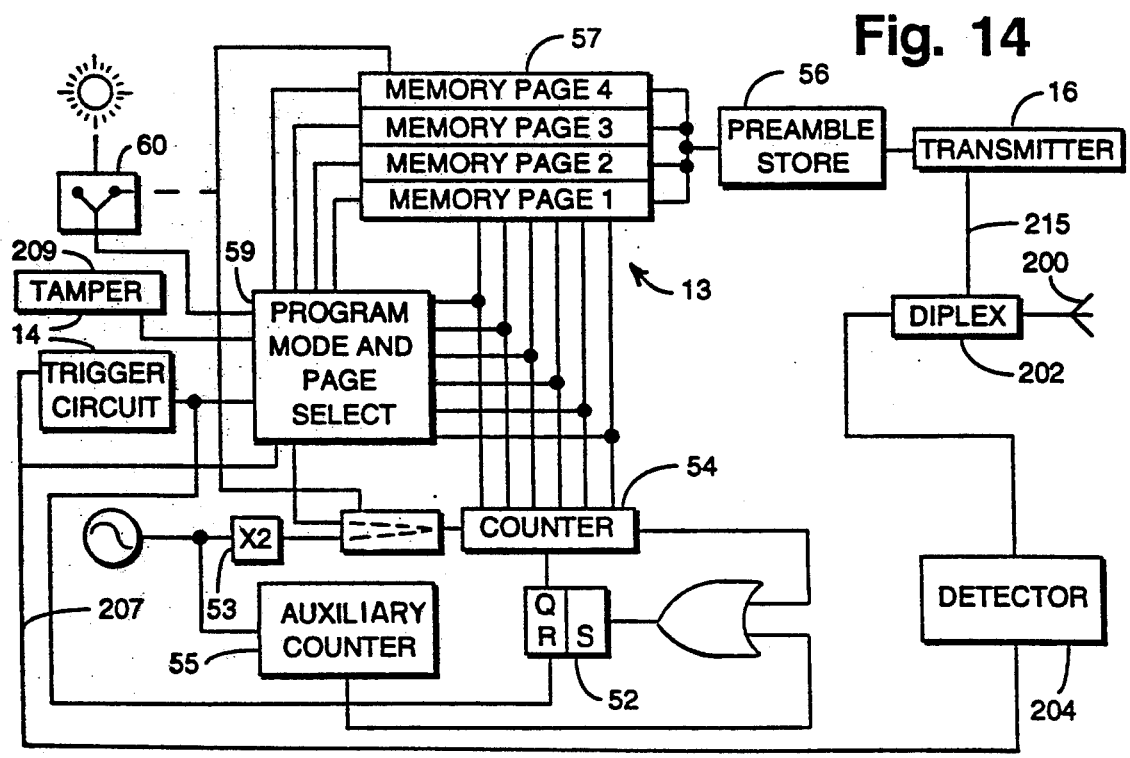
FIG. 14 is a bock diagram of a logic circuit in the information and identity storage device for use with a single transmit and receive antenna.

FIG. 14 is a block diagram of an alternative embodiment of the logic circuit 13, trigger circuit 14 and transmitter 16 of information identity and storage device (transponder) 10. This alternative embodiment utilizes a single antenna and a modified arrangement for detecting trigger pulses and data received by the single antenna. This alternative embodiment includes a diplexer 202 which connects antenna 200 to a detector circuit 204 and transmitter 16. Diplexer 202 is of a type well known in the art and connects incoming signals received by the antenna 200 to detector 204 unless a signal transmission from transmitter 16 is occurring. Whenever signals to be transmitted are applied to conductor 215 by transmitter 16, the connection from antenna 200 to detector 204 is broken and the signals on conductor 215 are connected to antenna 200 for transmission.

Detector 204 receives incoming signals and applies a detected representation of those signals to program mode and page select circuit 59 and to a trigger circuit 14' via a path 207. Trigger circuit 14' detects the approximately 20 microsecond trigger pulse from interrogator 11 and a response thereto enables previously discussed timing circuitry and program mode and page select circuit 59. Upon enablement, circuit 59 reads 128 bits from memory 57 and sends the bits read to transmitter 16 via preamble store 56 for transmission. Circuit 59 also controls memory 57 to store the incoming 64 bits of transmission 156 from interrogator 11. All incoming bits are applied to circuit 59 and gated therefrom for storage in memory 57 in response to timing signals applied to circuit 59. The writing of incoming information begins at approximately the time that the first bits of such information are received (376 microseconds after the start of the first trigger pulse). Circuit 59 responds to the second trigger pulse 158 by reading 128 bits from memory 57 and transmitting the bits so read via antenna 200 to interrogator 11.

FIG. 14 also includes a tamper protection circuit 209 which detects unauthorized attempts to modify transponder 10 by for example, changing the content of memory 57 in an inappropriate manner and writes information into memory 57 describing such an occurrence for later analysis. For example, tamper protection circuit 209 may write into memory 57 a combination of bits giving notice of tampering which will be detected when the memory 57 is next read.

Figure 15:
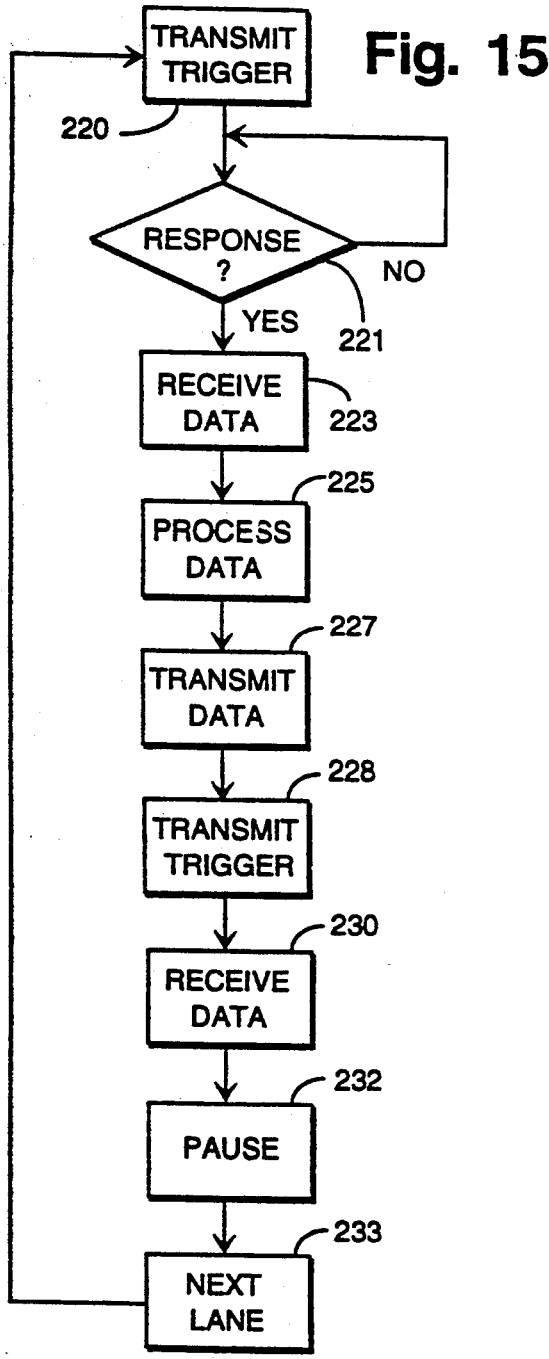
FIG. 15 is a flow diagram of functions performed by an embodiment of the interrogation station of FIG. 1.

FIG. 15 is a flow diagram of the functions performed by interrogator 11 in the performance of the information exchange of FIG. 13. The flow begins with a block 220 in which trigger pulse 150 is transmitted. Block 221 is then performed as a loop to determine if a response to the trigger pulse is received. When a transponder 10 is present, data 152 (FIG. 13) will be received in block 223 and immediately processed by data format memory and control 21 of the interrogator in a block 225. At the completion of processing step 225, (approximately 100 microseconds) new data 156 (FIG. 13) is transmitted in block 227 to the transponder 10. This is followed by the transmission of a second trigger pulse in block 228. The response 160 by transponder 10 to the second trigger pulse is received in block 230 and a pause (block 232) is initiated before proceeding to the performance of the same sequence in the next lane (block 233).

Figure 16:
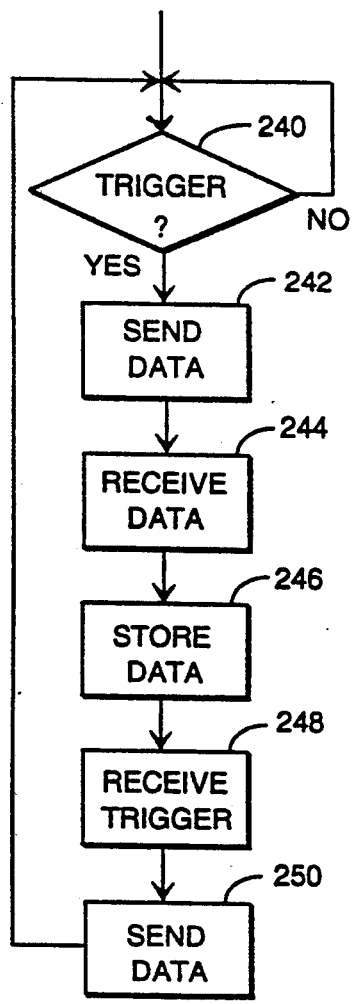
FIG. 16 is a flow diagram of the functions performed by information and identity storage device (transponder) of FIG. 14.

FIG. 16 represents the sequence of steps performed by transponder 10. This sequence begins with a block 240 in which transponder 10 is awaiting a trigger pulse. The performance of block 240 is for the most part, a passive performance so that little or no energy is expended between the reception of trigger pulses. When a trigger pulse is detected in block 240, transponder 10 immediately sends 128 bits of data (block 242) via antenna 200. After sending data 152 transponder 10 is passive for the 100 microsecond period it takes to process the data in interrogator 11. Thereafter, transponder 10 receives in block 244, the 64 data bits 156 from interrogator 11 which are stored in memory 57 step 246. Upon the reception of trigger pulse 158 immediately after data storage in block 246, transponder 10 transmits data 160 via antenna 200 and returns to the beginning state of awaiting an initiating trigger pulse. Generally stated, by the operation shown in FIG. 16, a first trigger pulse 160 starts a sequence which runs through block 250 and returns to await the start of the sequence again when a subsequent trigger pulse 150 is received. The FIG. 16 sequence may be initiated by the same interrogator 11 or the interrogator 11 of another vehicle identification arrangement elsewhere.

Although the embodiment described herein has been specifically described as being suitable for highway and railroad use, it will be apparent to those skilled in the art, that the system has many applications and various changes may be made to the circuits and elements described herein without departing from the scope of the present invention which is limited only by the following claims.

For example, the preceding embodiments were described regarding certain specified antennas and antenna types. It will be understood by those of ordinary skill in the art that the invention set forth in the following claims has application to many types of antennas in both standing wave and travelling wave varieties. Further, either downward radiating antennas mounted above vehicles travelling on a road or those radiating upward from the road surface can be utilized to advantage.

What is claimed is:

1. A system for the exchange of information via electromagnetic transmission and reception between a fixed location interrogator comprising a data signal processing means and a transponder moving in the vicinity of said interrogator, said system comprising:
   means at said interrogator for periodically transmitting trigger pulses;
   means, comprising storage means at said transponder, responsive to a first received one of said trigger pulses for transmitting a first data message derived from data contained by said storage means at the time that said first trigger pulse is received;
   means at said interrogator for receiving said first data message and responsive to the receipt thereof for generating and transmitting a second data message;
   means at said transponder for receiving said second data message and for storing data derived from said second data message in said storage means;
   means at said interrogator for transmitting a second trigger pulse a predetermined period of time after said first trigger pulse, the predetermined period of time being of sufficient length to permit the storage in said storage means of data derived from said second message; and
   means at said transponder for transmitting a third data message responsive to said second trigger pulse, said third data message comprising data derived from the data contained by said storage means at the time of said second trigger pulse.

2. The system of claim 1 comprising means for analyzing said third data message to determine the proper operation by said transponder in response to said second data message.

3. The system of claim 2 wherein said interrogator comprises means for deriving said second data message from said first data message.

4. The system of claim 3 wherein said interrogator comprises means for deriving said second data message from said first data message and data from weigh in motion apparatus.

5. The system of claim 3 wherein said interrogator comprises means for deriving said second data message from said first data message and data relating to roadway use tolls.

6. A fixed location interrogator for exchanging information with a transponder, comprising a storage means, moving in the vicinity of said interrogator, said interrogator comprising:
   antenna means for transmitting and receiving signals conveyed by electromagnetic radiation;
   means for periodically transmitting a first trigger pulse via said antenna means;
   means for receiving a first data message from said transponder and responsive to the receipt thereof for generating and transmitting a second data message via said antenna means;
   means for transmitting a second trigger pulse via said antenna means a predetermined period of time after the transmission of said second data message; and
   means for receiving a third data message via said antenna means and for determining from the content of said third data message the proper operation by said transponder in response to said second data message.

7. A transponder for exchanging information with a fixed location interrogator, said transponder moving in the vicinity of said interrogator and comprising:
storage means for containing transponder data;
antenna means for transmitting and receiving signals conveyed by electromagnetic radiation;
means responsive to a first trigger pulse received via said antenna means for transmitting via said antenna means a first data message derived from data contained by said storage means at the time that said first trigger pulse is received;
means for receiving a second data message from said interrogator via said antenna means and for storing data derived from said second data message in said storage means; and
means responsive to a second trigger pulse received from said interrogator via said antenna means a predetermined period of time after said first trigger pulse for transmitting a third data message comprising data derived from the data contained by said storage means at the time of said second trigger signal.

8. A method of exchanging information between a fixed position interrogator and a transponder, comprising storage means for storing data, and moving in the vicinity of said interrogator, said method comprising:
periodically transmitting trigger pulses by said interrogator;
receiving at said transponder a first one of said trigger pulses transmitting by said transponder first data message derived from data contained by said storage means, in response to said first received trigger pulse;
receiving said first data message by said interrogator;
transmitting by said interrogator a second data message derived from said received first data message;
receiving said second data message at said transponder;
storing in said storage means data derived from said received second data message;
transmitting by said interrogator a second trigger pulse a predetermined period of time after said first trigger pulse, said predetermined period of time being of sufficient length to permit the completion of the preceding storing step; and
transmitting by said transponder in response to said second trigger pulse, a third data message derived from the data contained by said storage means at the time of said second trigger pulse.

9. The method of claim 8 comprising analyzing by said interrogator said third data message to assure proper operation by said transponder in response to said second data message.

10. The method of claim 9 comprising deriving by said interrogator, said second data message from said first data message.

11. The method of claim 9 comprising deriving, by said interrogator, said second data message from said first data message and data from weigh in motion apparatus.

12. The method of claim 9 comprising deriving, by said interrogator, said second data message from said first data message and data relating to roadway use tolls.

13. In a system for exchanging information between a fixed position interrogator and a transponder moving in the vicinity of said interrogator, a method of operating said interrogator comprising:
periodically transmitting trigger pulses;
receiving a first data message from said transponder within a predetermined period of time after a first of said trigger pulses;
transmitting a second data message responsive to the receipt of said first data message;
transmitting a second trigger pulse a predetermined period of time after the transmission of said second data message;
receiving a third data message from said transponder after the second trigger pulse transmission step; and
determining from the content of said third data message the proper operation of said transponder.

14. In a system for exchanging information between a fixed position interrogator and a transponder comprising storage means and moving in the vicinity of said interrogator, a method of operating said transponder comprising:
receiving a first trigger pulse from said interrogator;
transmitting, in response to said received first trigger pulse, a first data message derived from data contained by said storage means at the time said first trigger pulse is received;
receiving a second data message from said interrogator;
storing in said storage means data derived from said second data message;
receiving a second trigger pulse from said interrogator after said storing step; and
transmitting a third data message comprising data derived from data contained by said storage means at the time that said second trigger pulse is received.

* * * * *

UNITED STATES PATENT AND TRADEMARK OFFICE
CERTIFICATE OF CORRECTION

PATENT NO. : 5,196,846
DATED : March 23, 1993
INVENTOR(S) : William K. Brockelsby et al.

It is certified that error appears in the above-identified patent and that said Letters Patent is hereby corrected as shown below:

Column 2, line 36, change "higl" to --high--
Column 4, line 36, change "&n" to --an--.

Column 12, line 19, change "conductor 127" to --conductor 121--.
Column 19, line 36, change "fron" to --from--.

Signed and Sealed this

Twenty-ninth Day of March, 1994

Attest:

BRUCE LEHMAN

*Attesting Officer*  *Commissioner of Patents and Trademarks*